United States Patent
Kubb et al.

(10) Patent No.: US 11,667,263 B2
(45) Date of Patent: Jun. 6, 2023

(54) ACCESS-PROTECTED CONTROL OF AN ACTUATOR OF AN ELECTRIC PARKING BRAKE

(71) Applicant: Lucas Automotive GmbH, Koblenz (DE)

(72) Inventors: Andreas Kubb, Isselbach (DE); Jens-Peter Kohrt, Koblenz (DE); Ralf Kinder, Kadenbach (DE); Stefan Grieser-Schmitz, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 632 days.

(21) Appl. No.: 15/877,921

(22) Filed: Jan. 23, 2018

(65) Prior Publication Data

US 2018/0236974 A1  Aug. 23, 2018

(30) Foreign Application Priority Data

Feb. 21, 2017 (DE) .......................... 102017001657.7

(51) Int. Cl.
| | |
|---|---|
| *B60R 25/08* | (2006.01) |
| *B60T 17/22* | (2006.01) |
| *B60R 25/34* | (2013.01) |
| *B60T 1/00* | (2006.01) |
| *B60T 13/74* | (2006.01) |

(52) U.S. Cl.
CPC .............. *B60R 25/08* (2013.01); *B60R 25/34* (2013.01); *B60T 1/005* (2013.01); *B60T 13/741* (2013.01); *B60T 17/22* (2013.01); *B60T 17/221* (2013.01); *B60R 2325/108* (2013.01)

(58) Field of Classification Search
CPC ... B60R 25/08; B60R 25/34; B60R 2325/108; B60T 1/005; B60T 13/741; B60T 17/22; B60T 17/221
See application file for complete search history.

(56) References Cited

U.S. PATENT DOCUMENTS

| | | | | |
|---|---|---|---|---|
| 5,825,287 A | * | 10/1998 | Zarybnicky, Sr. | .... F16D 66/028 340/453 |
| 6,394,235 B1 | | 5/2002 | Poertzgen et al. | |

(Continued)

FOREIGN PATENT DOCUMENTS

| | | |
|---|---|---|
| DE | 19732168 C1 | 1/1999 |
| DE | 102007004941 A1 | 7/2008 |

(Continued)

*Primary Examiner* — Truc M Do
(74) *Attorney, Agent, or Firm* — Robert James Harwood

(57) ABSTRACT

An actuator for an electric parking brake, EPB, is described. The actuator comprises a motor configured to actuate an actuating member of the EPB, as well as a reception interface configured to receive an enablement code. An enablement code is assigned to the EPB actuator which individualizes the EPB actuator against other EPB actuators. The actuator further comprises an evaluation unit configured to verify the received enablement code on the basis of the enablement code allocated to the EPB actuator and to enable a control of the motor in case of a positively verified enablement code. There is further provided a control device for the EPB actuator, an electric parking brake and a vehicle having the EPB actuator and corresponding operating methods.

7 Claims, 5 Drawing Sheets

(56) References Cited

U.S. PATENT DOCUMENTS

| | | | |
|---|---|---|---|
| 7,401,867 B2* | 7/2008 | Riddiford | B60T 8/885 |
| | | | 303/20 |
| 8,265,816 B1* | 9/2012 | LaFrance | B60L 50/64 |
| | | | 701/22 |
| 8,423,241 B2 | 4/2013 | Muders et al. | |
| 8,452,507 B2 | 5/2013 | Poertzgen et al. | |
| 2004/0041689 A1* | 3/2004 | DeBono | B60R 25/252 |
| | | | 340/5.52 |
| 2005/0161298 A1* | 7/2005 | Nilsson | B60T 8/885 |
| | | | 188/290 |
| 2008/0059038 A1* | 3/2008 | Yoshida | G05B 13/0265 |
| | | | 701/99 |
| 2010/0299035 A1* | 11/2010 | Maron | B60T 13/746 |
| | | | 701/70 |
| 2014/0152422 A1* | 6/2014 | Breed | G07C 9/32 |
| | | | 340/5.52 |
| 2016/0001781 A1* | 1/2016 | Fung | G16H 50/20 |
| | | | 701/36 |
| 2016/0304096 A1* | 10/2016 | Khafagy | B60W 10/184 |
| 2017/0361816 A1* | 12/2017 | Besier | B60T 8/1766 |
| 2018/0297555 A1* | 10/2018 | Simon | B60W 10/20 |

FOREIGN PATENT DOCUMENTS

| | | |
|---|---|---|
| DE | 102007059687 A1 | 6/2009 |
| DE | 102007059688 A1 | 6/2009 |

\* cited by examiner

ACCESS-PROTECTED CONTROL OF AN ACTUATOR OF AN ELECTRIC PARKING BRAKE

CROSS-REFERENCE TO RELATED APPLICATIONS

This application claims priority to German Patent Application No. 10 2017 001 657.7, filed 21 Feb. 2017, the disclosures of which are incorporated herein by reference in entirety.

BACKGROUND OF THE INVENTION

The present disclosure relates generally to the field of motor vehicle brake systems. Specifically, aspects associated with access-protected control of an actuator of an electric parking brake are described.

Electric parking brakes (EPB) are now being used in many modern motor vehicles and generally have a plurality of electric actuators, which are also referred to as EPB actuators hereinbelow. Each EPB actuator comprises a motor which actuates an actuating member of the electric parking brake via a gear, for example, in order to activate or release the electric parking brake.

In a hydraulic motor vehicle brake system, the EPB actuators are installed in the region of the wheel cylinders in order to actuate them electromechanically in parking brake operation (details thereof will be found, for example, in DE 197 32 168 A). In normal braking operation, on the other hand, the wheel cylinders are actuated hydraulically. To that end, the wheel cylinders are fluidically connected to a hydraulic pressure source. This hydraulic pressure source can comprise, for example, a main cylinder or an electrically operated hydraulic pump.

From DE 10 2007 059 687 A there is known a safety concept for an intelligent EPB actuator. In DE 10 2007 059 687 A, an intelligent EPB actuator is understood as being an EPB actuator that comprises its own processing unit as well as its own control unit for the motor of the actuator. The control unit thereby contains the power electronics required to control the motor. This power electronics comprises power transistors arranged as an H-bridge.

The processing unit of each EPB actuator is subordinate to a central main control unit. This means that the processing unit cannot decide independently on a control of the motor associated therewith but performs such a control in dependence on the reception of a control command from the main control unit.

Problems arise when incorrect signals are received from the main control unit or the control unit receives an incorrect signal owing to an error of the processing unit. In the case of such errors, the electric parking brake may release itself in an uncontrolled manner on a slope or initiate an undesired braking operation when the vehicle is moving. In order to avoid such safety-critical situations, DE 10 2007 059 687 A proposes a separate activation line between the main control unit and the control unit of each EPB actuator. This activation line runs parallel to a control line between the main control unit and the processing unit of each EPB actuator.

In order to increase the safety of the system, the control unit allows the motor to be controlled by the processing unit only subject to an activation signal received via the activation line. Specifically, the signal level on the activation line is so coded that control of the motor by the processing unit is possible only when an activation signal with a signal level between 5 V and 12 V is present.

The safety concept proposed in DE 10 2007 059 687 A is capable of preventing incorrect actuation of the EPB actuators in the event of internal system errors. However, unauthorized access to the EPB actuator cannot be prevented. Unauthorized persons are thus able to gain access to the control line and the activation line in order to release the closed EPB actuators of a parked vehicle by feeding in suitable signals and to steal the vehicle.

BRIEF SUMMARY OF THE INVENTION

The feature underlying the present disclosure is to protect an EPB actuator from unauthorized access.

According to a first aspect there is proposed an actuator for an electric parking brake. The actuator comprises a motor configured to actuate an actuating member of the electric parking brake. The actuator further comprises a reception interface configured to receive an enablement code, wherein an enablement code is assigned to the EPB actuator which individualizes the EPB actuator against other EPB actuators. The actuator further comprises an evaluation unit configured to verify the received enablement code on the basis of the enablement code allocated to the EPB actuator and to enable a control of the motor in case of a positively verified enablement code.

The enablement code that individualizes the EPB actuator can individualize the EPB actuator against one or more other EPB actuators of a particular EPB. Thus, if the EPB of a motor vehicle comprises two EPB actuators, for example, then two different enablement codes can be assigned to the two EPB actuators. The enablement codes assigned to the two EPB actuators can additionally differ from the enablement codes that are assigned to EPB actuators installed in other vehicles. Alternatively, the same enablement code can be assigned to the EPB actuators of a particular electric parking brake, wherein the enablement code differs, however, from electric parking brake to electric parking brake, so that different enablement codes are again assigned to the actuators of different electric parking brakes.

There comes into consideration as the enablement code any code that is suitable for individualizing each of a plurality of EPB actuators. However, it is not necessary (and technically generally not feasible) to define an unlimited number of enablement codes. For the purpose of sufficiently secure access protection, it is generally sufficient to specify at least a four-figure or five-figure number of enablement codes.

The enablement codes can be defined in any desired manner. Thus, each enablement code can use, for example, one or more of the following codings or can be translated into such a coding: a binary coding, a coding in the form of a numerical sequence or general character sequence, a coding by modulation of at least one of the following properties of a signal transmitting the enablement code: amplitude, frequency, phase, pulse width, etc.

According to one variant, the EPB actuator further comprises a memory in which comparative data relating to the enablement code assigned to the actuator are stored. The comparative data can be the enablement code itself or data allowing the enablement code to be determined. The evaluation unit can have access to the memory and be configured, in order to verify the received enablement code, to compare the enablement code determined on the basis of the comparative data and assigned to the actuator with the received enablement code.

In one variant, the EPB actuator further comprises a control line for the motor. The control line can extend from a control interface contained in the EPB actuator to the motor. In the control line for the motor there can be arranged a switch which switches into a closed position or remains in the closed position in order to enable a control of the motor in the case of a positively verified enablement code. On the other hand, the switch can adopt an open position (or be switched into an open position) in its normal position and/or in the case of a negatively verified enablement code.

According to one variant, the enablement code is received by means of a dedicated enablement signal. According to this variant, the enablement code can be modulated onto the enablement signal or otherwise contained therein.

According to another variant, the enablement code is modulated onto a control signal for the motor. The control signal can have a signal level which corresponds substantially to an on-board supply voltage of the motor vehicle in which the electric parking brake is installed. For regulating the motor speed, the control signal can be pulse-width-modulated. In such a case, the enablement code can be modulated onto the control signal in addition to the pulse width modulation.

The EPB actuator can further comprise a demodulator which is configured to separate the enablement code modulated onto the control signal from the control signal. The enablement code separated from the control signal can then be fed to the evaluation unit.

In the case of an enablement code modulated onto the control signal, the reception interface can be formed by a control interface for the motor. In other words, the control interface for the motor at the same time serves as the interface for reception of the enablement code modulated onto the control signal. According to another implementation, the EPB actuator comprises both a control interface for the motor and a reception interface for the enablement code which is different from the control interface. In this case, the enablement code can be modulated onto or otherwise contained in an enablement signal that is different from the control signal.

The enablement code can be encrypted. In this case, the evaluation unit can further be configured to decrypt the encrypted enablement code. Both symmetric and asymmetric encryption methods come into consideration for the encryption.

There is also provided an actuator system for an electric parking brake, wherein the actuator system comprises a plurality of the EPB actuators proposed herein, wherein different enablement codes are assigned to the plurality of EPB actuators. The plurality of EPB actuators can belong to the same electric parking brake, that is to say be installed in the same vehicle. Alternatively or in addition, the plurality of EPB actuators can be assigned to different electric parking brakes and thus also to different vehicles.

According to a further aspect there is provided a control device for an actuator, provided with a motor, of an electric parking brake. The control device comprises a control circuit configured to generate a control signal for the motor of the EPB actuator. The control device further comprises a transmission interface configured to transmit an enablement code to the EPB actuator in order to enable a control of the EPB actuator based on the control signal, wherein the transmitted enablement code individualizes the EPB actuator against other EPB actuators.

The control device can be in the form of a control unit (electronic control unit, ECU). The control device can be configured to control a plurality of EPB actuators installed in a vehicle.

The control device can further comprise a modulator configured to modulate the enablement code onto the control signal. In this case, the transmission interface can be formed by a control interface for the motor. Alternatively, the modulator can be configured to modulate the enablement code onto an enablement signal that is different from the control signal. In this case, the control device can further comprise a control interface for the motor which is different from the transmission interface.

The control circuit installed in the control device can comprise power electronics (for example power transistors) for controlling the EPB actuator. In this case, the EPB actuator can be in the form of a non-intelligent actuator within the meaning of DE 10 2007 059 687 A.

There is likewise provided an electric parking brake which comprises at least one of the EPB actuators presented herein or the actuator system presented herein comprising a plurality of EPB actuators. The electric parking brake can further comprise the control device presented herein.

The EPB actuators can be based on an electromechanical principle. In other variants, the electric EPB actuators can be operated electrohydraulically or electropneumatically.

According to a further aspect there is provided a vehicle which comprises an automatic transmission configured without a mechanical gear lock. The vehicle further comprises the electric parking brake presented herein. According to a variant, the vehicle additionally comprises an automatic transmission control unit configured to control the electric parking brake (e.g. a control device thereof) in order to keep the vehicle stationary. Such a control of the electric parking brake can take place in particular when an automatic transmission control element (e.g. a selector lever) which can be operated by the driver is brought into a park (P) position.

There is likewise provided a method of enabling the control of an actuator, provided with a motor, of an electric parking brake. The method comprises the steps of receiving an enablement code, wherein an enablement code is assigned to the EPB actuator which individualizes the EPB actuator against other EPB actuators, verifying the received enablement code on the basis of the enablement code allocated to the EPB actuator, and enabling a control of the motor in case of a positively verified enablement code.

There is likewise provided a method of controlling an actuator, provided with a motor, of an electric parking brake, which method comprises the steps of generating a control signal for the motor of the EPB actuator and transmitting an enablement code to the EPB actuator in order to enable a control of the EPB actuator based on the control signal, wherein the transmitted enablement code individualizes the EPB actuator against other EPB actuators.

The methods can comprise one or more further steps, as described above and hereinbelow.

There is further provided a computer program which comprises program code for carrying out the methods presented herein when the program code is executed on a processor. There is likewise provided a motor vehicle control unit or a system comprising a plurality of such control units which comprises (at least) one processor for carrying out the method presented herein and a memory coupled with the processor, in which the corresponding computer program is stored.

Other advantages of this invention will become apparent to those skilled in the art from the following detailed description of the preferred embodiments, when read in light of the accompanying drawings.

DETAILED DESCRIPTION OF THE INVENTION

Figure 1:
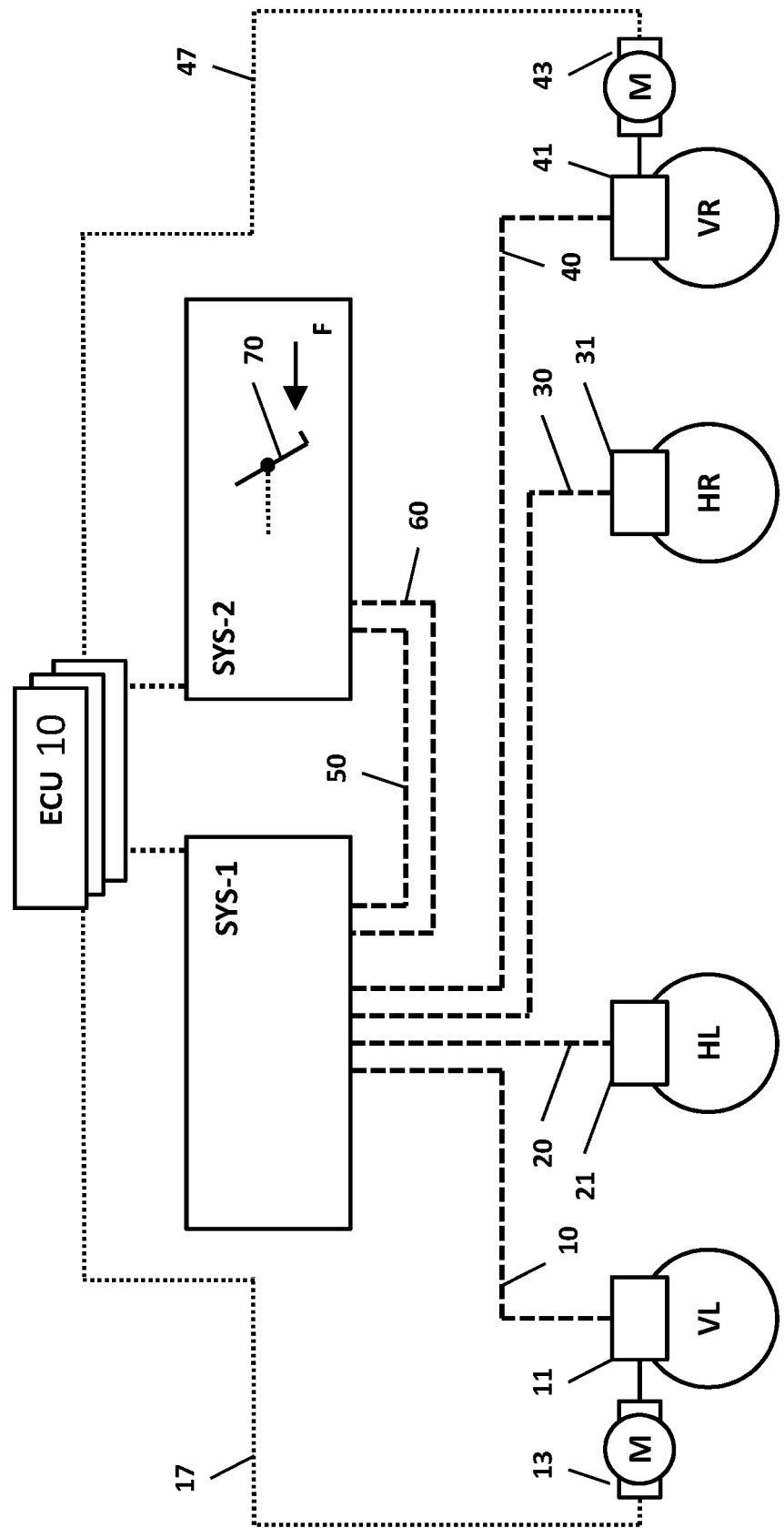
FIG. 1 shows an exemplary embodiment of a motor vehicle brake system.

In FIG. 1, components of a motor vehicle brake system are shown schematically. The brake system comprises a first subsystem SYS-1, a second subsystem SYS-2, at least one electronic control unit (ECU) 10, four hydraulically actuatable wheel brakes 11, 21, 31, 41, and (at least) two EPB actuators 13, 43. Each of the two sub-systems SYS-1 and SYS-2 and the at least two EPB actuators 13, 43 are configured to generate a brake force at least a subset of the four wheel brakes 11, 21, 31, 41.

In the exemplary embodiment shown in FIG. 1, the control unit 10 allows the two subsystems SYS-1 and SYS-2 and also the at least two EPB actuators 13, 43 to be controlled. In other exemplary embodiments, control could also be performed by two or more control units. In particular, a separate control unit 10 could be provided for each of the two EPB actuators 13, 43 for redundancy reasons. At least one of these redundantly provided control units 10 could further be configured to control at least one of the two subsystems SYS-1 and SYS-2.

The wheel brakes 11, 21, 31 and 41 are connected via hydraulic lines 10, 20, 30 and 40 to the first subsystem SYS-1, more precisely to a hydraulic control unit (HCU), not shown in FIG. 1, thereof. In the exemplary embodiment, the first subsystem SYS-1 is a system that allows the brake pressures in the wheel brakes 11, 21, 31 and 41 to be generated and regulated independently of the driver and individually. The first subsystem SYS-1 can implement, for example, an antilock and/or electronic stability control system (ABS or ESC).

The second subsystem SYS-2 is connected via hydraulic lines 50, 60 to the first subsystem SYS-1 and is adapted to generate brake pressures for the first subsystem SYS-1 and/or the wheel brakes 11, 21, 31 and 41. For hydraulic pressure generation, the second subsystem SYS-2 can comprise a main cylinder which can be actuated by means of a brake pedal 70 and/or an electrically actuatable hydraulic pressure source.

The two EPB actuators 13, 43 are provided in order to allow the vehicle to be kept stationary in a secure manner. In the exemplary embodiment, the two actuators 13, 43 are based on an electromechanical principle and act on an actuating member in the form of a wheel cylinder associated with the respective wheel brake 11, 41. A variant of this principle is described in DE 197 32 168 A, the disclosure of which is incorporated herein in respect of the construction and functioning of the actuators 13, 43.

In the exemplary embodiment, the actuator 13 acts on the wheel brake 11 associated with the left front wheel VL and the actuator 43 acts on the wheel brake 41 associated with the right front wheel VR, since the front wheels VL, VR are able to transmit a greater brake force component than the rear wheels HL, HR due to the dynamic axle load distribution. Of course, in other exemplary embodiments the two actuators 13 and 43 could also act on the wheel brakes 21, 31 associated with the rear wheels HL and HR of the vehicle. EPB actuators could also be provided at all four wheels VL, VR, HL, HR.

According to FIG. 1, the actuator 13 is controlled by the control device 10 via a control line 17, and the actuator 43 is controlled by the control device 10 via a control line 47. An input device (e.g. a switch or button), not shown in FIG. 1, allows the driver to input his control command for a standard "park" mode, in order to stop the vehicle permanently. The control command—typically "close parking brake" or "open parking brake"—is acquired and evaluated by the control unit 10. According to the result of the evaluation, the two actuators 13, 43 are then actuated by the control unit 10.

The control unit 10 is also able to actuate the EPB actuators 13, 43 independently of an actuation of the input device and thus independently of the desired control of the driver. Such an actuation takes place, for example, in the context of a starting aid which is also known as auto hold or hill hold and which, by automatically closing the EPB actuators 13, 43, prevents the vehicle from rolling on a sloping roadway and allows the vehicle to start easily on the sloping roadway by automatically opening the EPB actuators 13, 43 (e.g. in dependence on the angle of slope and/or the torque provided by the drive motor of the vehicle). The EPB actuators 13, 43 can further be controlled by the control unit 10 in order to perform braking or emergency braking autonomously, in particular as a fallback level, for example, in remote controlled parking (RCP) operation.

Figure 2A:
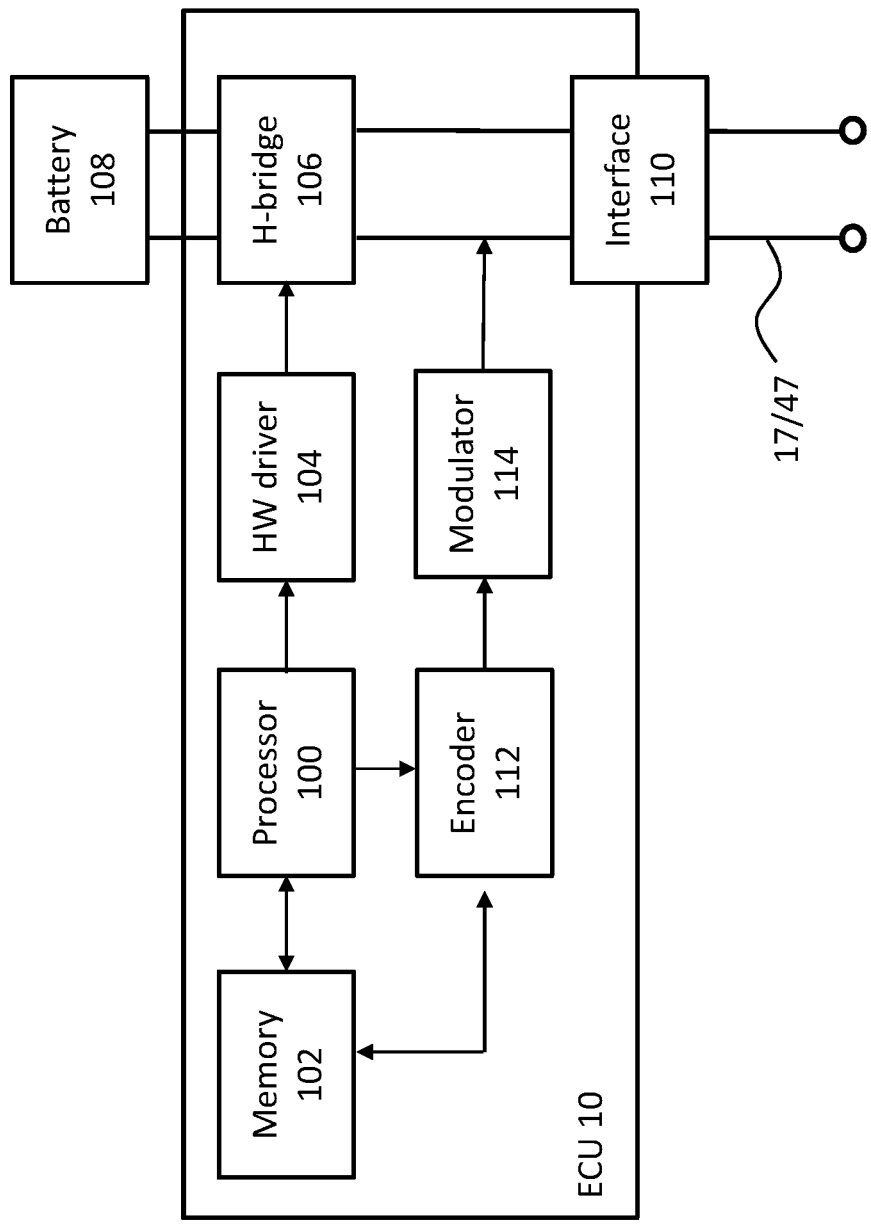
FIG. 2A shows a first exemplary embodiment of a control unit for the motor vehicle brake system according to FIG. 1.

FIG. 2A shows, in a schematic view, an exemplary embodiment of the control unit 10 from FIG. 1 for controlling the two EPB actuators 13, 43. It will be appreciated that the control unit 10 shown in FIG. 2A can be used in brake systems which differ from the system of FIG. 1. It will further be appreciated that the functions of the control unit 10 described hereinbelow with reference to FIG. 2A could also be applied to a system of two or more control units 10. Thus, it is conceivable in particular to associate a separate control unit 10 having the interfaces shown in FIG. 2A with each of the two EPB actuators 13, 43 for redundancy reasons.

In the exemplary embodiment according to FIG. 2A, the control unit 10 comprises a processor 100 as well as a memory 102 coupled with the processor 100. Program code is stored in the memory 102, which program code can be executed by the processor 100 in connection with the control of the EPB actuators 13, 43. Data, for example regarding an enablement code assigned to the two EPB actuators 13, 43, can also be stored in the memory 102.

The control unit 10 further comprises a hardware driver 104 coupled with the processor 100, as well as power electronics in the form of an H-bridge 106 comprising a plurality of power transistors. The hardware driver 104 is configured to control the power transistors of the H-bridge 106 subject to a control signal received from the processor 100. This control can be based on a pulse width modulation in order to adjust speeds of the motors installed in the EPB actuators 13, 43.

The H-bridge 106 is coupled via suitable connections of the control unit 10 (not shown in FIG. 2A) with a battery 108 and thus with the on-board power supply of the motor vehicle. The H-bridge 106 allows the supply voltage for the EPB actuators 13, 43 to be connected and the polarity of the supply voltage (and thus the direction of rotation of the motors installed in the EPB actuators 13, 43) to be specified.

The control signals generated by the H-bridge 106 are fed via a control interface 110 of the control unit 10 and corresponding control lines (see reference numerals 17 and 47 in FIG. 1) to the EPB actuators 13, 43 (as supply signals). The processor 100, the hardware driver 104 and the H-bridge 106 therefore together form a control circuit which is configured to generate control signals for the EPB actuators 13, 43.

As illustrated in FIG. 2A, the control unit 10 further comprises an encoder 112 as well as a modulator 114. The encoder 112 is configured to determine an enablement code assigned to the EPB actuators 13, 43. This enablement code is stored in the encoder 112 itself or is read from the memory 102 by the encoder 112.

The enablement code can correspond to a multi-digit numerical sequence, such as, for example, "136976". The enablement code can generally be defined in any desired manner that can be transmitted in signal form, as long as it is capable of individualizing the EPB actuators 13, 43 in a sufficiently secure manner.

In the present exemplary embodiment, it is assumed that the same enablement code is assigned to the two EPB actuators 13, 43, wherein the enablement code assigned to the EPB actuators 13, 43 differs, however, from the enablement codes that are assigned to EPB actuators installed in other vehicles. The enablement code assigned to the two EPB actuators 13, 43 in this case individualizes the two EPB actuators 13, 43 against EPB actuators installed in other vehicles.

The enablement code determined by the encoder 112 is outputted by the encoder 112 to a modulator 114, subject to a command received by the processor 100. The modulator 114 is configured to modulate the enablement code received from the encoder 112 onto the control signal. For this purpose, the modulator 114 in the present exemplary embodiment is coupled to an output line of the H-bridge 106. In other exemplary embodiments, the modulator 114 can also be part of the hardware driver 104 or can be implemented in another manner.

The control signal with the enablement code modulated thereon is outputted via the interface 110. The interface 110 therefore has a dual function, since it functions both as a control interface of the control unit 10 in respect of the EPB actuators 13, 43 and as a transmission interface for the enablement code.

Figure 2B:
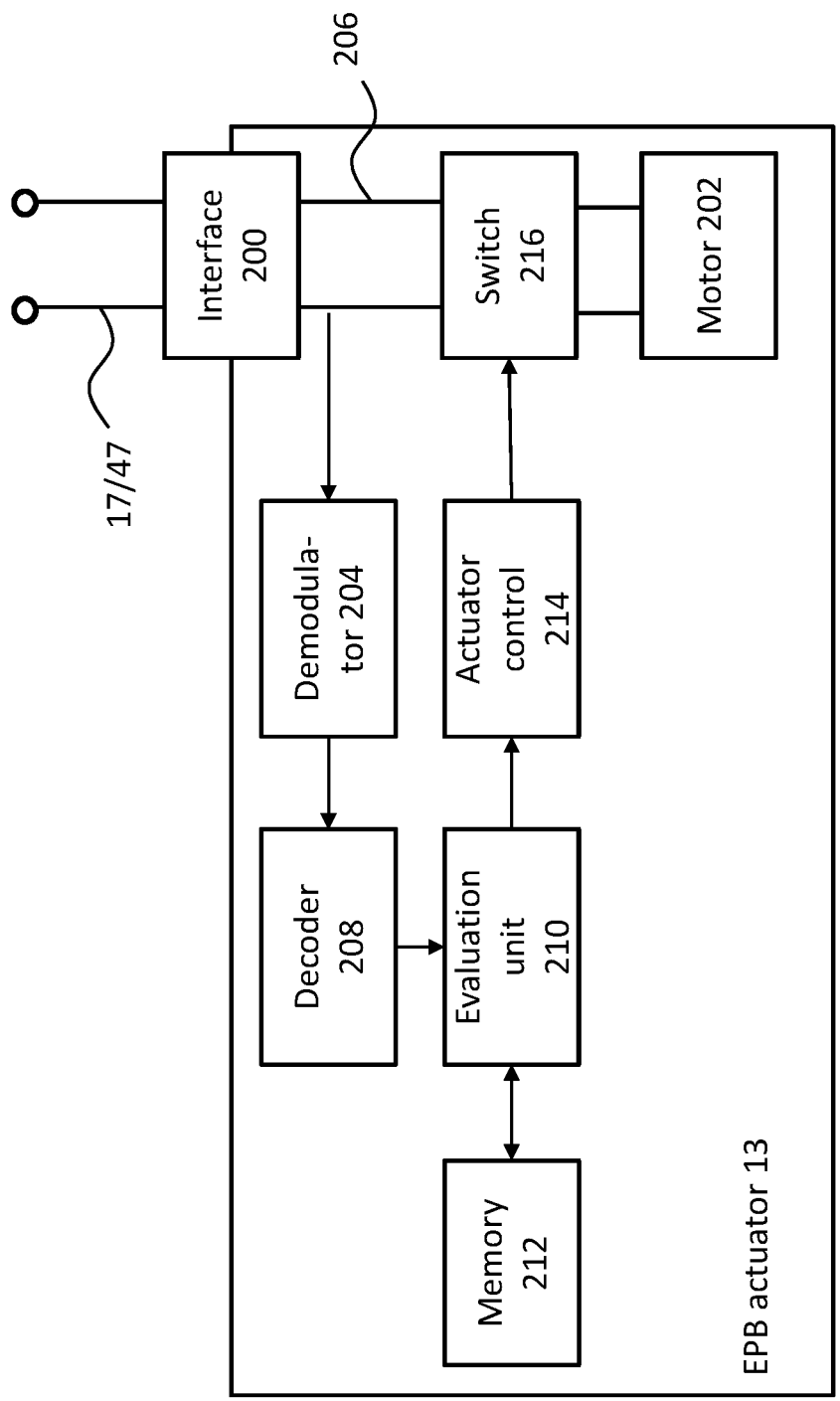
FIG. 2B shows a first exemplary embodiment of an EPB actuator for control by the control unit according to FIG. 2A.

FIG. 2B shows an exemplary embodiment of the EPB actuator 13. The other EPB actuator 43 according to FIG. 1 has the same construction.

As shown in FIG. 2B, the EPB actuator 13 comprises an input interface 200 for the control signal outputted by the control unit 10. This interface 200 therefore serves both as the control interface for a motor 202 of the EPB actuator 13 and as the reception interface for the enablement code modulated onto the control signal.

A demodulator 204 of the EPB actuator 13 is coupled to one or more control lines 206 of the EPB actuator 13 which run from the interface 200 to the motor 202. The demodulator 204 is configured to separate the enablement signal with the enablement code modulated onto the control signal from the control signal and output it to a decoder 208. The decoder 208 determines the enablement code on the basis of the enablement signal outputted by the demodulator 204 and outputs the enablement code to an evaluation unit 210.

The evaluation unit 210 is generally configured to verify the enablement code received via the interface 200 on the basis of the enablement code assigned to the EPB actuator 13 and to enable a control of the motor 202 in the case of a positively verified enablement code. For this purpose, the evaluation unit 210 has access to a memory 212 of the EPB actuator 13. The enablement code assigned to the EPB actuator 13 is stored in the memory 212, so that, when the enablement code received via the interface 200 and the enablement code stored in the memory 212 match, the enablement code received via the interface 200 can be positively verified. In this case, the evaluation unit 210 enables a control of the motor 202. If, on the other hand, no match can be determined, the control of the motor 202 is not enabled. The case where no match can be determined includes cases where no enablement code is received via the interface 200, the demodulator 204 is unable to demodulate an enablement signal, and the decoder 208 is not able to decode an enablement code.

It should be pointed out that the enablement code assigned to the EPB actuator 13 can be stored in the memory 212 in different ways. Thus, it is conceivable, for example, that the enablement code, for reasons of security, is stored in encrypted form in the memory 212 and can only be decrypted for the above-mentioned comparison purposes by means of a key known to the evaluation unit 210. In addition or alternatively, the enablement code received via the interface 200 can have been encrypted by the control unit 10. In this case, an appropriate key for decrypting the enablement code received in encrypted form can be stored either in the memory 212 or in the evaluation unit 210.

As already mentioned, the evaluation unit 210 enables a control of the motor 202 in the case of a positively verified enablement code. For this purpose, a corresponding control command is given to an actuator control 214 of the EPB actuator 13. On the basis of the control command received from the evaluation unit 210, a switch 216 is controlled by the actuator control 214. As shown in FIG. 2B, the switch 216 is arranged in at least one of the control lines 206 between the interface 200 and the motor 202. On the basis of the control command from the evaluation unit 210, the actuator control 214 brings the switch 216 into a closed position (or leaves the switch 216 in its closed position) in the case of a positively verified enablement code. In its normal position, on the other hand, the switch 216 can be open in order to prevent unauthorized control of the motor 202.

In its closed position, the switch 216 allows the motor 202 to be controlled on the basis of the control signal received from the control unit 10 via the interface 200. The resulting actuation of the motor 202 effects, according to the polarity of the control signal, a movement of the wheel cylinder coupled with the motor 202 via a gear for opening or closing the electric parking brake.

In the exemplary embodiment according to FIGS. 2A and 2B, the motor control circuit (including the processor 100, the hardware driver 104 and the power electronics H-bridge 106) is arranged in the control unit 10. For this reason, the EPB actuator 13 is a non-intelligent actuator within the meaning of DE 10 2007 059 687 A. This also means that, in the present exemplary embodiment, the control signal received via the interface 200 corresponds to the supply signal of the motor 202. The supply of power to the EPB actuator 13 therefore takes place via the control unit 10. In this connection, the switch 216 in some variants can further be configured to adjust the polarity of the supply voltage. By adjusting the polarity, the direction of rotation of the motor 202 is specified.

In order to prevent undesired control of the motor 202, the supply voltage in a variant can be connected by the control unit 10 only when a control of the motor 202 is actually to take place. Thus, the supply voltage can be applied to the EPB actuators 13, 43 by the control unit 10 only when a driver actuates the input device of the electric parking brake in order to stop the vehicle. The enablement signal with the enablement code can at the same time be modulated onto the corresponding control signal.

By interrupting the supply of power through the switch 216, miscontrol of the actuators 13, 43 in safety-critical driving situations can be prevented. The optional adjustment of the polarity of the supply voltage by means of the switch 216 permits reliable pre-selection of the direction of rotation of the motor 202, which likewise prevents miscontrol.

Figure 3A:
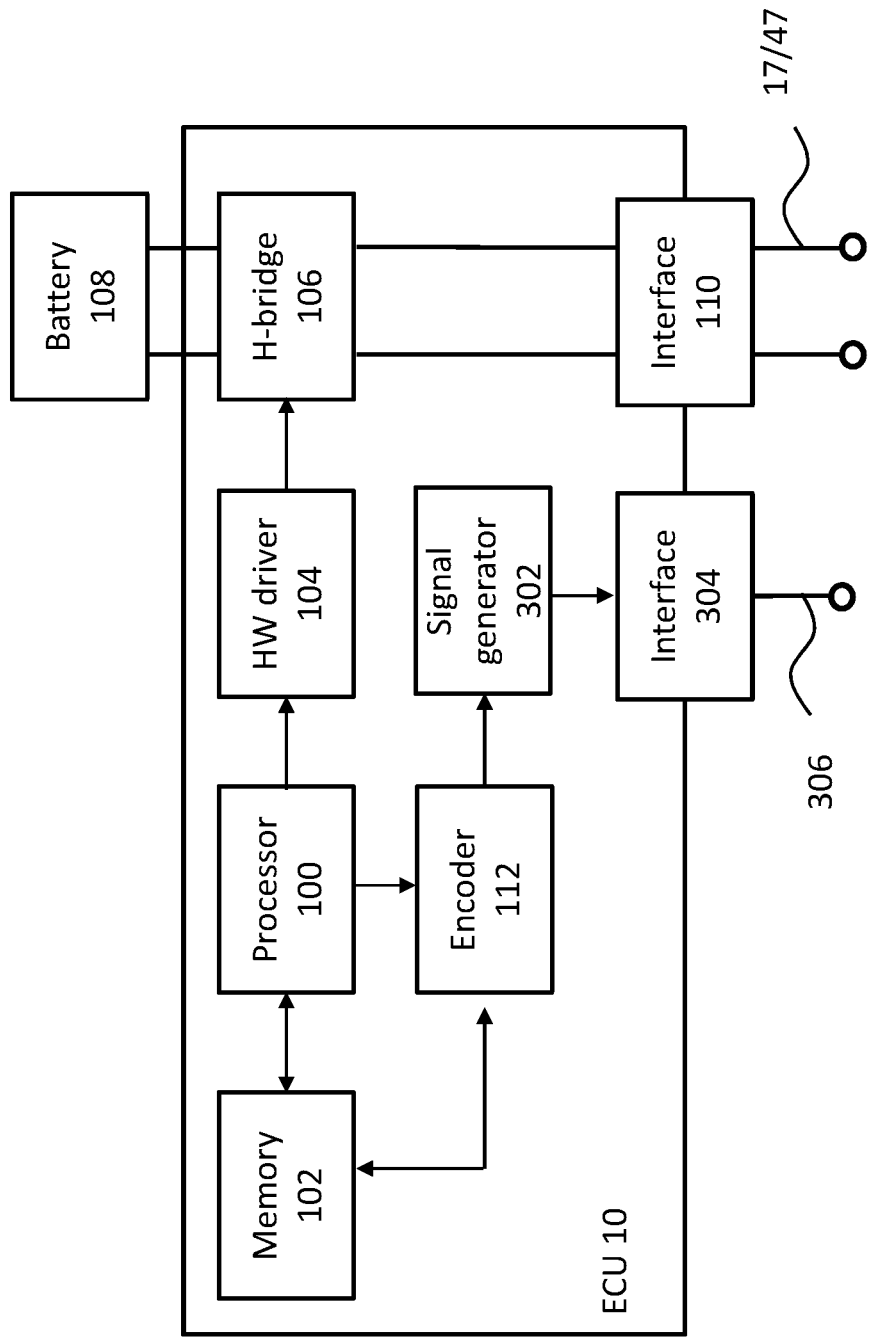
FIG. 3A shows a second exemplary embodiment of a control unit for the motor vehicle brake system according to FIG. 1.
Figure 3B:
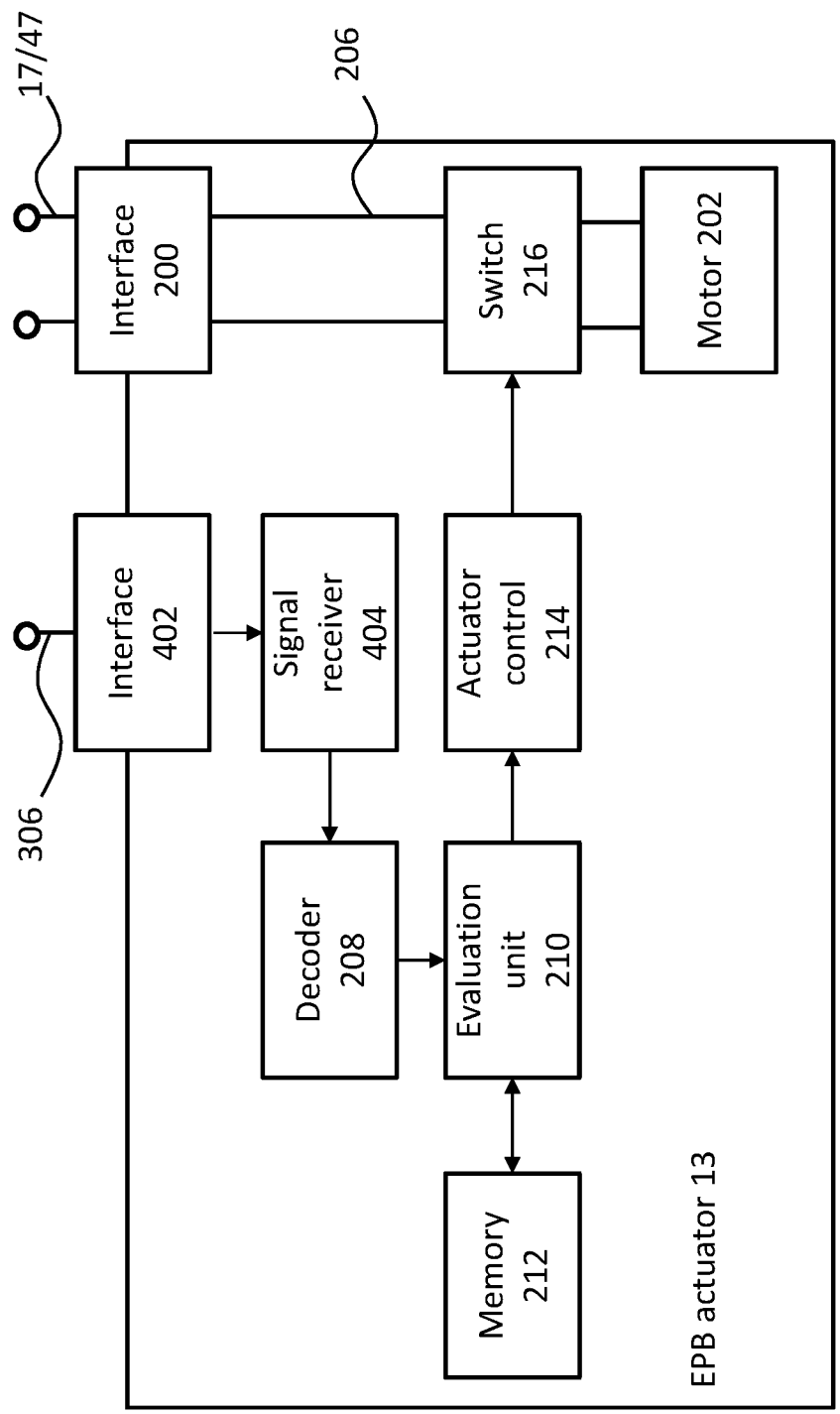
FIG. 3B shows a second exemplary embodiment of an EPB actuator for control by the control unit according to FIG. 3A.

In FIGS. 3A and 3B, alternative exemplary embodiments of the control unit 10 and of the EPB actuator 13 are shown. Elements that correspond with FIGS. 2A and 2B are provided with the same reference numerals, so that only the differences are discussed in greater detail hereinbelow.

As shown in FIG. 3A, the control unit 10 comprises a signal generator 302 arranged downstream of the encoder 112 instead of the modulator 114. The signal generator 302 is configured to generate an enablement signal on the basis of the enablement code received from the encoder 112 and to transmit it to the EPB actuator 13 via a transmission interface 304 and an enablement line 306 downstream of the transmission interface 304. The transmission interface 304 is provided parallel to the control interface 110.

The EPB actuator 13 according to FIG. 3B in turn comprises a complementary reception interface 402, which is coupled with the enablement line 306. This reception interface 402 is provided parallel to the control interface 200. A signal receiver 404 downstream of the interface 402 is configured to receive the enablement signal and transmit it to the decoder 208. The decoder 208 processes the enablement signal in order to determine the enablement code contained therein, whereupon there follow the further operations already discussed above.

The interfaces described herein can be in the form of plug contacts or other contacts. The interfaces can be connected together via lines or bus systems.

There comes into consideration as the enablement code generally any code suitable for individualization, for example a sequence of characters of four, five or more characters (e.g. numbers). The enablement code can be contained in the enablement signal in binary form, so that the enablement code can be expressed as a sequence of bits. Alternatively or in addition, the enablement code can be modulated onto another signal (e.g. onto the enablement signal and/or the control signal) directly or using an auxiliary signal. Modulation can be effected by means of frequency, phase, amplitude and/or pulse width modulation.

Storing of the enablement code or codes in the control unit 10 as well as in the associated EPB actuators 13, 43 can take place at the end of the respective production process, for example with the scope of end-of-line tests, or during installation thereof in a motor vehicle. In order to be able to determine the enablement codes again when replacing EPB components, identification numbers assigned to the components are advantageously linked with the corresponding enablement codes in a database.

In one variant, a positive verification of the enablement code is required both for closing and for opening the electric parking brake. According to another variant, a positive verification is necessary only for releasing the electric parking brake, in order to allow the electric parking brake to be readjusted at any time (that is to say also with a negative or no verification of the enablement code). In this case, protection against unauthorized release of the electric parking brake is still ensured. A temporally limited enablement of the electric parking brake at least in the release direction is also conceivable, for example while the ignition is switched on. In addition or alternatively, an enablement of the electric parking brake at least in the release direction via radio is conceivable.

A possible field of application of the technical teaching presented herein is in vehicles which are equipped with automatic transmission without a mechanical gear lock. Because of the absence of a mechanical gear lock, the parked vehicle is no longer sufficiently protected against theft, because conventional electric parking brakes can easily be released by unauthorized third parties.

The use of individualized enablement codes at least for releasing the EPB actuators can—in addition to other purposes—in particular ensure improved protection against theft. In addition, the EPB actuators can be mechanically protected against violent actions from outside. Thus, an actuator housing can be made of metal. In addition or alternatively, the actuator housing parts can be connected using special screws or other fixing means which cannot be released with conventional tools.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An actuation system for an electric parking brake comprising:
    a first subsystem being in fluid communication with wheel brakes each having an electronic parking brake;
    a second subsystem having a master cylinder and a brake pedal, the second subsystem being in fluid communication with the first subsystem;
    a control unit having an encoder module and a modulator module and being in communication with the first and second subsystems; and
    electric parking brake actuators (EPB actuators) in electronic communication with the control unit and an electric parking brake associated with each EPB actuator, each EPB actuator including a motor and an evaluation unit;
    wherein an encoder module of the control unit is configured to generate and send a control signal having a unique enablement code to each EPB actuator, each EPB actuator receiving a different unique enablement code;
    the unique enablement code being necessary for each EPB actuator to actuate the associated electric parking brake and the unique enablement code is modulated onto the control signal; and
    wherein the evaluation unit of each EPB actuator is configured to verify the unique enablement code and, upon verification, the EPB actuator enables a control of the associated motor.

2. The actuation assembly as claimed in claim 1, further comprising:
    a processor module and an electronic control unit (ECU) memory module which are disposed in the control unit wherein the memory module stores programming code which is implemented by the processor module; and
    an EPB actuator memory module disposed in each EPB actuator;
    wherein the evaluation unit of each EPB actuator has access to the EPB actuator memory module and is configured to verify the unique enablement code by comparing the unique enablement code received from the control unit against data stored in the EPB actuator memory module.

3. The actuation assembly as claimed in claim 1, further comprising for each EPB actuator:
   a control line coupling the control unit to the EPB actuator and enabling direct electronic communication between the EPB actuator and the control unit; and
   a switch which is arranged in the control line and is configured to switch into a closed position or remain in the closed position in order to enable a control of the motor upon positive verification of the unique enablement code received by the EPB actuator.

4. The actuation assembly as claimed in claim 1, further comprising for each EPB actuator:
   a demodulator module disposed in the EPB actuator wherein the demodulator module is configured to separate the enablement code modulated onto the control signal from the control signal.

5. The actuation assembly as claimed in claim 1, wherein the reception interface is formed by a control interface for the motor.

6. The actuation assembly as claimed in claim 1, further comprising a control interface for the motor which is different from the reception interface.

7. The actuation assembly as claimed in claim 1, wherein the received enablement code is encrypted, and the evaluation unit is further configured to decrypt the encrypted enablement code.

* * * * *